June 2, 1942. F. A. ROJAS 2,285,053
METHOD OF CEMENTING ALUMINUM TO CELLULOSIC MATERIAL
Original Filed Jan. 15, 1937
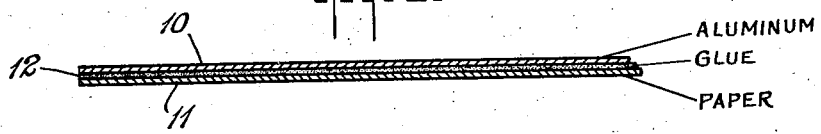
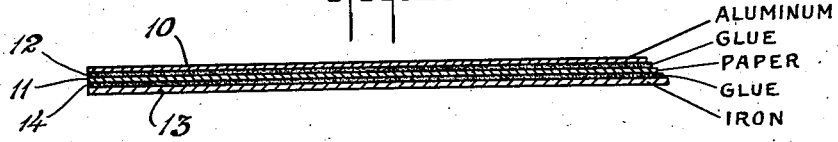
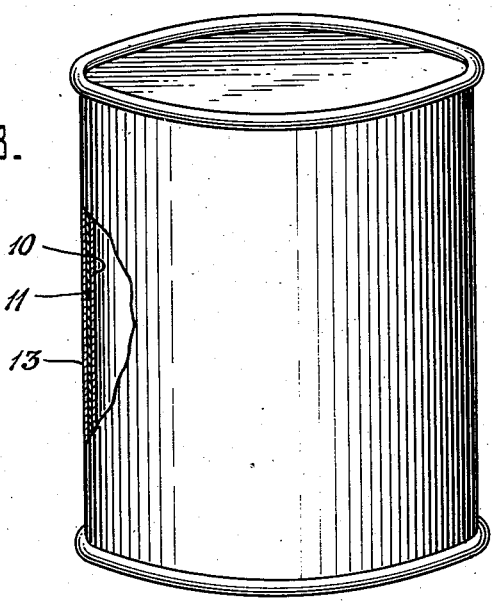
WITNESS
INVENTOR
F. A. ROJAS
BY
ATTORNEYS Patented June 2, 1942

2,285,053

UNITED STATES PATENT OFFICE 2,285,053

METHOD OF CEMENTING ALUMINUM TO CELLULOSIC MATERIAL

Floricel A. Rojas, New York, N. Y., assignor of one-half to Walter H. Liebman, Jr., New York, N. Y.

Application January 15, 1937, Serial No. 120,697
Renewed July 27, 1940

10 Claims. (Cl. 154—40)

The present invention relates to an improved method of uniting sheets of aluminum with a sheet of fibrous or cellulosic material, such as paper, cardboard or wood, and to the laminated structure so obtained and shaped articles made of such laminated structure.

More specifically, it is an object of the present invention to provide an improved method of uniting sheets of aluminum with sheets of cellulosic material, preferably paper or cardboard, whereby so strong and flexible a joint is secured that the composite sheet can be mechanically worked, as by being stamped, bent, drawn, etc., for the manufacture of various articles, such as cans for the preservation of food, dished plates, etc.

It is more particularly an object of the invention to provide, as its preferred embodiment, a laminated structure composed of a relatively thin sheet of aluminum and a relatively thick sheet of cardboard or similar material, the aluminum being sufficiently thick to provide impermeability, but not necessarily strength, while the cardboard backing contributes body and strength to the composite structure, the component sheets being so securely joined as to be capable of being mechanically shaped in their composited form without separation.

The present application is a continuation in part of my copending application Serial No. 59,681, filed January 18, 1936.

In accordance with the present invention, the aluminum sheet or foil is connected with the cellulosic sheet by way of a cementing layer of sodium silicate after the aluminum sheet has been suitably treated in a manner which will insure a continuous and strong bond with the cellulosic sheet by way of the silicate cement. This cement is peculiarly adapted for the production of the laminated material contemplated by the present invention not only because it is highly flexible and adheres both to cellulosic and aluminum surfaces but because, as set forth more in detail below, it forms an unusually strong joint with aluminum that has been pretreated in the manner shortly to be described. The use of sodium silicate for joining sheets of metal and paper is known but the adhesion that is obtained by the known methods of joining a sheet of aluminum with a sheet of paper by way of such cement is a comparatively weak one and is unsatisfactory for many purposes for which, for example, an aluminum-cardboard aggregate could be used, as in the manufacture of the shaped articles above mentioned.

In carrying out the process of my invention, the aluminum sheet is first treated in a manner which involves not only the cleaning of the metal surface to remove grease, dirt and other foreign matter, but also the conditioning of the metal so as to cause it to adhere strongly to the sodium silicate layer, and perhaps even react with the latter to form an integral bond, somewhat in the nature of a weld, between the cement and the surface layer of aluminum oxide The cleaning of aluminum surfaces prior to cementing to a sheet of paper, does not alone remove all the influences which militate against a strong and continuous bond with the cement. I have found that to insure a thorough and complete bonding of the aluminum to the cellulosic sheet by way of sodium silicate, it is necessary to subject the aluminum sheet or foil to a heat treatment at a temperature high enough to effect explusion of gaseous matter adhering to or adsorbed by the aluminum, but yet not so high as to cause alteration of the character of the aluminum surface, visible to the naked eye, nor so high as to make the aluminum capable of burning or carbonizing the cellulosic material. The heating may take place either in an aqueous or other liquid, or in the dry condition, and in the latter case it may be conducted either in the atmosphere or in the presence of an inert gas, or even in a vacuum. The heat treatment of the aluminum surface may be preceded by a cleaning operation, but in general it will be found that such cleaning occurs simultaneously with the heating of the metal.

The preliminary preparation of the aluminum sheet thus has for its object to obtain a sheet or foil which not only is free from grease and other foreign matter but has a surface which may be said to have been prepared or activated so that it will more readily unite, either physically or chemically, or both, with the silicate to form a continuous and strong connection.

According to one mode of carrying out the invention, the aluminum sheet is immersed in a hot or boiling liquid, such as water, and is kept therein until bubbles cease to form at the surface thereof and have all been driven to the top of the liquid. It will generally be found that about a three minutes' treatment will be sufficient, although a shorter period of immersion will often prove satisfactory, while longer periods may safely be employed. At the end of such treatment the aluminum sheet can be thoroughly wetted with water, indicating the complete absence of greasy material. In commercial operation, the aluminum may be immersed in the hot liquid in the form of cut sheets, either flat or rolled into loose coils, or the aluminum may be passed in the form of a continuous web through a tank containing the hot liquid, the speed being regulated to secure the requisite time of immersion.

I have found that salts and weak bases exert a favorable influence on the surface of the aluminum. The salts should be of such nature as not to exert any strong corroding action on the metal, and are preferably neutral in reaction or approximately so. Among the compounds that may be employed are the sulfates, sulfites, chlorides, carbonates, etc. of the alkali metals and also the soluble salts of the alkali earth and earth metals, and also salts of other metals which will not be precipitated by aluminum, including aluminum sulfate, aluminum acetate, barium hydroxide, boric acid, ferric sulfate, and in general compounds which do not act too corrosively on aluminum. A concentration of about 5–10% will usually be sufficient, although stronger or weaker solutions may be used, the concentration not being at all critical. Usually a shorter time of immersion will be required when a salt solution is employed, and the necessary minimum time for any particular salt or concentration can be determined by simple experiment.

In another embodiment of the invention, the aluminum sheet is heated either in the atmosphere or in an inert gas or in a vacuum, to an elevated temperature, but in no event should the aluminum be heated so high that its surface takes on a "goose-flesh" appearance. It will generally be found that this heat treatment will at the same time free the aluminum from greasy matter but if desired the aluminum can be cleaned with benzol or other grease solvent before or after the heat treatment. The aluminum can then be united with the cellulosic sheet in the manner described below. Satisfactory results will be obtained by heating the sheet to about 100–200° C. for 1 to 2 minutes, but higher temperatures may be employed for shorter periods of time.

It is important that the temperature during the heat treatment, especially in the dry condition, should not be too high; otherwise a continuous and reliable bond with the sodium silicate will not be obtained in commercial operation.

The aluminum sheet, having been prepared in one of the ways above described, is then coated with a suitable glue or cement. I have found sodium silicate to be a highly satisfactory adhesive for my purposes. The silicate, preferably in the 40° Bé. solution in which it is sold commercially, is accordingly applied to the cellulosic and metal sheets, or to only one of the sheets, and the two sheets then placed one on the other with a treated side of the aluminum in contact with the silicate. A gentle pressure is then exerted upon the aggregate so as to insure continuous contact of the sodium silicate both with the cardboard and with the aluminum sheet. The aggregate is then submitted to a gentle heat of approximately 50–55° C. for a period of from 15 minutes to an hour, 15 minutes being usually sufficient to bring about a strong bond between the two sheets. This bond is very probably promoted by a chemical reaction between the sodium silicate and the aluminum oxide on the surface of the aluminum, or between the aluminum and the sodium hydroxide resulting from the hydrolysis of the silicate, or between the aluminum and its oxide with the silicic acid. When the process has been completed, the aluminum and cellulosic product will adhere so tenaciously that it is difficult, if not impossible, to strip the one from the other, as can be done when sodium silicate is used as an adhesive without preliminary preparation of the aluminum.

I ascribe the unusually strong bond between the paper and metal that is obtained by my process to the elimination of what appears to be a closely adhering film of gases from the surface of the aluminum, aided by the preservation of the aluminum surface in a condition, or its conversion by relatively mild heating into a condition, which promotes a continuous and tenacious bond with the cellulosic sheet by way of the cement.

I refer in the claims to the aluminum in this condition as "de-gassed" aluminum, or aluminum in the "de-gassed" condition.

It appears that in the untreated aluminum sheets the occluded gases in some fashion obstruct the jointure between the metallic sheet and the sodium silicate layer and that the removal of such occluded gases facilitates contact and perhaps even chemical reaction between the cement and the aluminum throughout its whole surface. It is probable, although I do not wish to be understood as being committed to this theory, that on the application of heat to the cemented sheets, the sodium silicate reacts with the thin film of oxide on the surface of the aluminum sheet to form sodium aluminate. The resulting removal of the oxide leaves the surface of the aluminum roughened or "etched" and this brings about a close adhesion, unobstructed or uninterrupted by occluded gases, between the sodium silicate and the aluminum. It is, however, possible that the sodium aluminate is more readily formed with a heat pre-treated aluminum surface and either itself or in combination with the sodium silicate adheres more tenaciously to the aluminum surface than does sodium silicate itself.

Care should be taken not to use too much of the sodium silicate so as not to space the aluminum and the cellulosic product too far apart, as otherwise the joint would be no stronger than the layer of excess sodium silicate. Care should also be taken not to have the temperature of the heat treatment of the cemented sheets too high as otherwise the sodium silicate will effloresce or dehydration of silicic acid formed by hydrolysis of the cement will occur, such chemical dehydration affecting the adhesion very adversely. A temperature as high as 100° C. is therefore not recommended. With shorter periods of heating, higher temperatures than 55° C. may be employed, but, in general, temperatures should be avoided at which silicic acid is dehydrated.

By the processes described herein, there may thus be obtained a composite sheet of aluminum and, for example, cardboard, or of aluminum joined with a sheet of another metal such as steel, through an intermediate layer of cellulosic material, wherein the bond is so uniform and continuous that the laminated sheet can be subjected to various shaping operations without danger of separating the individual sheets of which it is composed. The steel sheet may be joined to the cellulosic sheet either in the manner above described or in any known manner. Dished and other shaped articles such as cans for receiving preserved foods or beverages, picnic plates, etc. can thus be made of the composite sheet by suitable shaping operations, the composite sheet acting very much as if it were an integral single layer sheet.

The sodium silicate may be applied directly to the aluminum or it may first be applied to the cellulosic sheet, and the layer of glue may be initially heated either on the cellulosic or on the aluminum sheet prior to the application of the other sheet.

Composite sheets obtained in accordance with the invention exhibit a remarkable strength in the joint. A laminated sheet composed of cardboard and aluminum foil united by sodium silicate in the manner above described can be bent repeatedly back and forth and strips can be wound and rewound upon a pencil without showing any separation. On the other hand, a sheet made with the same materials and cemented in the same way but in which the aluminum was merely cleaned with benzol to remove grease showed separation along large areas when subjected to mechanical strain.

Products made in accordance with the invention are illustrated by way of example on the accompanying drawing. In said drawing, Fig. 1 shows an enlarged section through a laminated sheet made up of aluminum and cellulosic material; Fig. 2 shows a laminated structure having a sheet of aluminum at one side and a sheet of iron or other metal upon the other which are joined together through an intermediate sheet of cellulosic material; and Fig. 3 shows a can adapted to receive preserved foods or beverages and made up of a laminated sheet made in accordance with the invention.

In Fig. 1, the numeral 10 indicates a sheet of aluminum, while the cellulosic or fibrous sheet is indicated at 11. As already stated, these two sheets may be made of any desired thickness, either the aluminum sheet or the cellulosic sheet being the thicker, depending upon the uses for which the composite sheet is to be employed. The present invention is, however, of particular utility in the production of laminated structures in which a relatively thick and strong sheet of cardboard or the like is cemented to a relatively thin aluminum foil.

The aluminum sheet, pre-treated in accordance with one of the procedures above described, is then coated with the intermediate layer of sodium silicate and the cellulosic sheet then applied. The cemented sheets are subjected to a temperature of about 50–50° C. for about 10–15 minutes under pressure and when dry represent a strongly coherent structure whose sheets cannot be stripped one from the other along the layer of cement.

It is important that the surface of the cellulosic sheet be permeable to the sodium silicate solution to enable the dried cement to become firmly anchored in at least the outer layers of fibre. This permeability permits the crystalloid portion of the cement to penetrate rapidly into the body of cellulosic material, such crystalloidal portion being continuously joined to the colloidal portion between the cellulosic and metal layers. The cellulosic sheet should accordingly not be calendered or contain any coating or addition on its cemented surface, such as grease, size, etc., which will interfere with the penetration of the cement.

Fig. 2 shows a sheet in which an aluminum sheet 10 is cemented to a cellulosic sheet 11 in any of the ways above described, the sheet 11 on its other side being cemented in any suitable manner to a sheet 13 of iron or other metal, the latter being joined to the sheet 11, for example, by a layer 14 of sodium silicate or other cement.

In Fig. 3 is shown a container which is made up of the sheet shown in Fig. 2. As illustrated, the aluminum surface 10 is on the inside of the container while the iron or steel or other metal surface 13 is upon the outside thereof. In view of the much higher cost of tin as compared with aluminum, a can made as shown in Fig. 3 can be manufactured much more cheaply than tin-coated all-metal cans. The intermediate layer of paper not only serves to join the aluminum sheet to the iron sheet but gives body and rigidity to the structure, while the external iron or steel sheet is wear-resisting and presents a neat and clean appearance.

The pressing of the composited sheets can be accomplished in any suitable manner, as by means of rollers, which may be heated by steam or electrically.

From the laminated sheets obtained as above described there may be produced in any known manner containers for comestibles which are odorless, do not impart any taste to the contents, are non-poisonous, and are light in weight but yet have great mechanical strength. Moreover, as only a single metal is exposed to the contents of the container, no local electroylitic action with its resulting contamination of the food or beverage can occur.

Instead of coating the aluminum with the moist cement and then applying the cellulosic or fibrous sheet, the laminated structure thereupon being subjected to heat and pressure, I may first apply a thin coating of cement to the aluminum sheet (and also the cellulosic sheet separately) and then dry the cement thereon. In this way a firm bond may be established between the layer of cement and the aluminum sheet and if desired also the cellulosic sheet separately. The hardened cement may then be superficially moistened and the two sheets brought together with the layers of cement in contact (when both sheets have been cemented), such two layers readily fusing into each other. In such case it may not be necessary to heat, although I prefer to subject the assembled structure to a temperature of about 50° C., whether or not the layers of cement were originally dried by heat on the separate aluminum and cellulosic sheets. This procedure insures proper action of the cement on the aluminum, and also insures the presence of an adequate layer of cement during the heating and pressing; a fresh layer of cement, on the other hand, tending to be squeezed out under pressure.

While in the preferred form of the invention a comparatively thin sheet of aluminum, as little as one thousandth of an inch in thickness, is connected to a relatively thick sheet of cellulosic material, it is within the scope of the invention to connect a relatively thin sheet of cellulosic material to a thick sheet of aluminum or to use sheets of substantially equal thickness, as illustrated. In view of the continuous and firm bond between the cellulosic and metal sheets obtained in accordance with the invention, my improved procedure may be employed in the coloring or printing of aluminum surfaces with substances which will not adhere to aluminum, but will adhere to, for example, paper. Thus a sheet of aluminum may be provided with a firmly adhering thin coating of paper which may be then printed or painted with any composition that will adhere to paper.

It will be appreciated that the tenacious and continuous bond which I secure between aluminum and cellulosic surfaces makes it possible to "plate" aluminum onto other metals or surfaces by way of the intermediate layer of paper, wood or other material. Also, the paper side of a paper coated aluminum sheet can be electroplated with a metal which will not readily plate on aluminum. The paper-coated aluminum can also be cemented to a plastic or non-metallic material such as Bakelite or Celluloid by way of the paper.

As above indicated, it is difficult to ascertain exactly what the effect of the preliminary heating on the aluminum surface is. I have determined, however, that the effect is not merely one of roughening of the surface. Thus I have mechanically roughened a cleaned aluminum surface with emery paper of different degrees of fineness and then cemented the metallic sheets to cardboard with the aid of sodium silicate in the manner above described. In each case, the bond was not continuous and separation occurred when the laminated sheet was coiled about a pencil. On the other hand, a highly polished sheet of aluminum which had been previously treated by being immersed in boiling water for about three minutes, gave under the same conditions a laminated sheet which showed no separation when coiled about a pencil and even when subjected to still greater abuse. The preheating of the aluminum according to the invention thus favorably conditions the metal to a hitherto unsuspected degree for attachment to a sodium silicate cement.

I claim:

1. The method of cementing sheet aluminum to a sheet of cellulosic material which comprises subjecting the aluminum sheet to an elevated temperature at which occluded gases are expelled, uniting such sheet with a sheet of cellulosic material by means of a sodium silicate cement, and applying heat and pressure to the joined sheets until a firm bond therebetween is established.

2. The method of cementing sheet aluminum to a sheet of cellulosic material which comprises immersing a sheet of aluminum in hot water until occluded gases have been expelled, and then connecting such sheet with a sheet of cellulosic material by means of a sodium silicate cement.

3. The method of cementing sheet aluminum to a sheet of cellulosic material which comprises immersing the aluminum sheet in a hot solution of a compound relatively inert toward aluminum until occluded gases have been expelled, and then uniting such sheet with a sheet of cellulosic material by means of a sodium silicate cement.

4. The method of cementing sheet aluminum to a sheet of cellulosic material which comprises immersing the aluminum sheet in a hot aqueous solution of an alkali metal salt until occluded gases have been expelled, and then uniting such sheet with a sheet of cellulosic material by means of a sodium silicate cement.

5. The method according to claim 1 wherein the heating of the aluminum is conducted in the air in the dry condition below temperatures at which the surface of the aluminum becomes visibly changed.

6. The method according to claim 1 wherein the cement is dried under pressure at temperatures above room temperature but below 100° C.

7. The method according to claim 1 wherein the cement is dried under pressure at temperatures of about 50–55° C.

8. The method according to claim 1 wherein a layer of cement is first applied to and dried on at least one of the sheets before the sheets are joined together, said cement, when applied to the aluminum, being applied after the heating of the latter.

9. The method according to claim 1 wherein the laminated structure is joined to a second sheet of metal by way of the cellulosic sheet.

10. The method as set forth in claim 1, wherein the surface of the cellulosic sheet is uncalendered and thus easily permeable to the sodium silicate cement.

FLORICEL A. ROJAS.